(12) United States Patent
Jacotey et al.

(10) Patent No.: US 10,549,133 B2
(45) Date of Patent: Feb. 4, 2020

(54) BREATHING SYSTEM AND SEAT FOR AIRCRAFT CREW MEMBER OR PASSENGER

(71) Applicant: Zodiac Aerotechnics, Plaisir (FR)

(72) Inventors: Jérémy Jacotey, Croissy S/seine (FR); Dominique Lemasson, Le Tremblay sur Mauldre (FR)

(73) Assignee: Zodiac Aerotechnics, Plaisir (FR)

( * ) Notice: Subject to any disclaimer, the term of this patent is extended or adjusted under 35 U.S.C. 154(b) by 597 days.

(21) Appl. No.: 15/309,456

(22) PCT Filed: May 20, 2014

(86) PCT No.: PCT/IB2014/001214
§ 371 (c)(1),
(2) Date: Nov. 8, 2016

(87) PCT Pub. No.: WO2015/177584
PCT Pub. Date: Nov. 26, 2015

(65) Prior Publication Data
US 2017/0136269 A1 May 18, 2017

(51) Int. Cl.
*A62B 18/08* (2006.01)
*A62B 25/00* (2006.01)
(Continued)

(52) U.S. Cl.
CPC .......... *A62B 18/084* (2013.01); *A62B 18/025* (2013.01); *A62B 25/005* (2013.01); *B64D 11/00* (2013.01); *B64D 2231/025* (2013.01)

(58) Field of Classification Search
CPC ............... A62B 18/084; A62B 18/025; A61M 16/0605; A61M 16/0683
See application file for complete search history.

(56) References Cited

U.S. PATENT DOCUMENTS 3,792,702 A 2/1974 Delest
2007/0068520 A1 3/2007 Laib et al.
(Continued)

FOREIGN PATENT DOCUMENTS

EP 2060294 5/2009
FR 2983832 6/2013
(Continued)

OTHER PUBLICATIONS

International Patent Application No. PCT/IB2014/001214, Written Opinion dated Jan. 21, 2015 ,6 pages.
(Continued)

*Primary Examiner* — LaToya M Louis
(74) *Attorney, Agent, or Firm* — Kilpatrick Townsend & Stockton LLP; Dean W. Russell

(57) ABSTRACT

A breathing system for an aircraft crew member or passenger may include a face-fitting device, a storage area added to a seat headrest for retaining the face-fitting device in a storage position apart from the head, and a back portion for retaining the face-fitting device on the user's head when the breathing system is used. The back portion is retained on the headrest by a removable fixing mechanism when the face-fitting device is in the storage position, and the removable fixing mechanism is released upon the tightening the face-fitting device on the user's head.

18 Claims, 8 Drawing Sheets

(51) Int. Cl.
  *A62B 18/02*   (2006.01)
  *B64D 11/00*   (2006.01)

(56) References Cited

U.S. PATENT DOCUMENTS

2013/0118500 A1* 5/2013 Stevens ............... A61M 16/024
                                              128/205.25
2013/0147239 A1  6/2013 Guering

FOREIGN PATENT DOCUMENTS

| WO | 2012066394 | 5/2012 |
| WO | 2012085616 | 6/2012 |
| WO | 2015177584 | 11/2015 |

OTHER PUBLICATIONS

International Patent Application No. PCT/IB2014/001214, International Search Report dated Jan. 21, 2015, 4 pages.
Europe Patent Application No. 14780546.9, Examination Report, dated Dec. 13, 2017.

\* cited by examiner

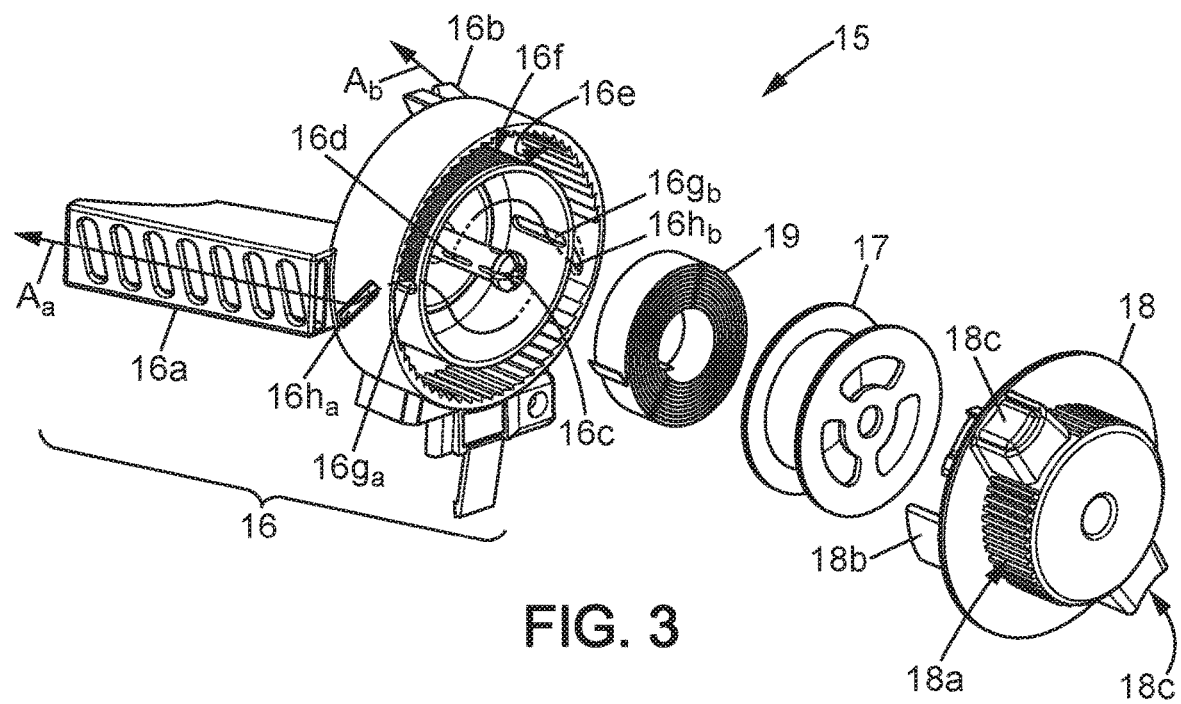
FIG. 3
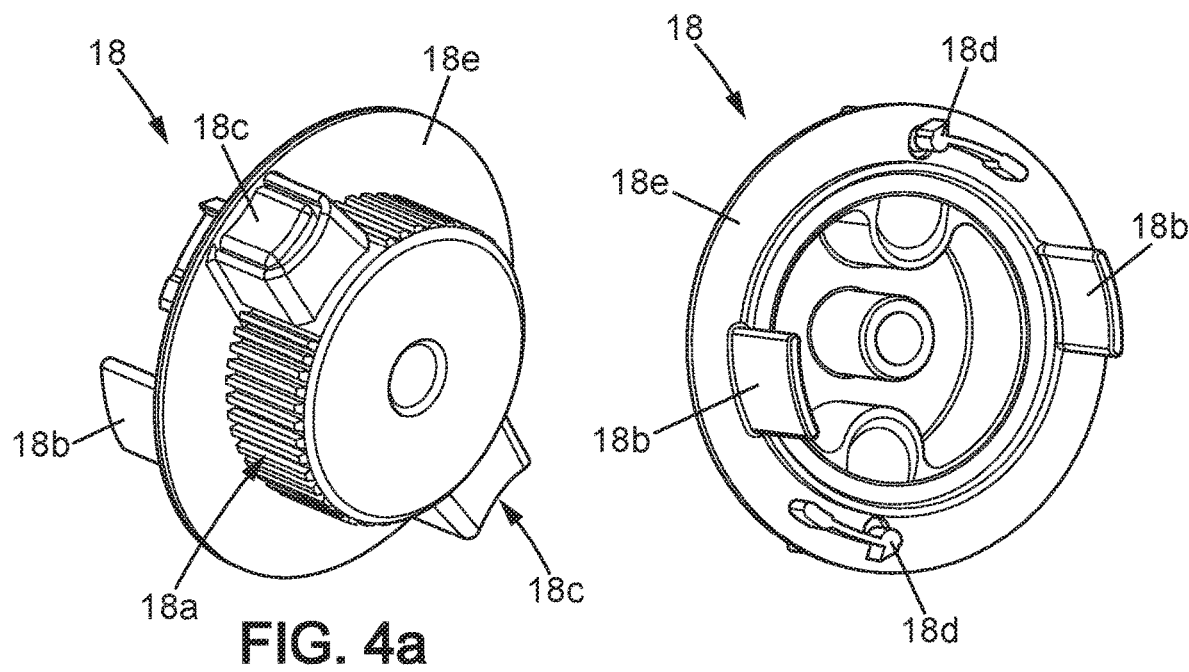
FIG. 4a
FIG. 4b

BREATHING SYSTEM AND SEAT FOR AIRCRAFT CREW MEMBER OR PASSENGER

CROSS-REFERENCE TO RELATED APPLICATIONS

This application is the U.S. national phase entry of International Patent Application No. PCT/IB2014/001214, filed on May 20, 2014, the entirety of which is incorporated herein by this reference.

The invention relates to a breathing system and a seat for an aircraft crew member or passenger.

BACKGROUND OF THE INVENTION

In an aircraft such as a plane, the pilots, crew members or passengers are each provided with a breathing system capable of delivering oxygen to a face-fitting device. In case of depressurization or urgency, the user should be able to catch the face-fitting device from the storage position of this latter and place it correctly onto his face for breathing within this face-fitting device. Depending on the aircraft type and also special requirements or standards, the face-fitting device may cover only the nose and mouth of the user, or may be combined with a mask so as to cover the whole face. Major constraints to be met by the breathing systems implemented relate to the time necessary for the user to catch the face-fitting device and place it onto his face, and also with the weight and reliability of the breathing system.

Additional constraints relate to the comfort for the user who is equipped with the face-fitting device, the capability for the face-fitting device to suit any size for the user's head, and the fitting tightness for avoiding important oxygen leak.

Face-fitting devices which are commonly used in airplanes are provided with pneumatic tubes which are to be arranged behind the head when the face-fitting device is placed onto the face. The tubes are inflated for placing the device onto the head and then deflated again for retaining the face-fitting device in worn-position. But the inflating and deflating of the tubes are performed with the breathing gas itself because this gas is available and easy to implement. Thus the fitting-on operation results in consumption of oxygen-containing gas instead of saving this gas for breathing purpose only.

It is also known to provide the crew member's seat with an additional support which is dedicated for storing the face-fitting device when not used, but with an arrangement which allows rapid catch by the crew member. But such support may be cumbersome for some arrangements of the space around the crew member's seat.

CN 103144771, corresponding to FR 2 983 832, discloses storing a breathing mask which is dedicated to an aircraft pilot in the headrest of the pilot seat. This storing location is efficient in saving space around the pilot seat.

US 2007/0068520 describes implementing a flexible hood around the head of an occupant of a pressurized aircraft. FIGS. 15 to 19 of this document show that the hood is initially stowed in the occupant's seat, then deployed from the headrest of the seat over the occupant's head, and then released from the seat by the occupant leaning forwards.

Starting from this situation, the invention aims at improving the existing solutions with respect to at least some of the above constraints.

SUMMARY OF THE INVENTION

To this purpose, a first aspect of the present solution proposes a breathing system for an aircraft user who is sitting on a seat within the aircraft, this system comprising:

- a face-fitting device which is suitable for being applied onto at least a lower portion of the face of the user, and for delivering an oxygen-containing gas;
- holding means which are suitable for retaining the face-fitting device in position on the face, and comprise a back portion suitable for applying onto a top or back part of the user's head when these holding means operate for retaining the face-fitting device on the face; and
- storage means which are suitable for retaining the face-fitting device in a storage position apart from the head when the breathing system is not used.

The invention breathing system further comprises:

- removable fixing means which are suitable for retaining the back portion of the holding means affixed to a headrest of the seat when the face-fitting device is in the storage position.

In addition, the removable fixing means are suitable for being released when the holding means are retaining the face-fitting device on the face.

Therefore, the face-fitting device in its storage position can be located near the user's head, and can be grasped easily over the head for placing it on the face. The back portion of the holding means in the storage position is also near the back part of the head, so that the whole breathing system can be implemented very quickly by the user upon depressurization or emergency. The fixing means of the back portion on the headrest being released upon operation of the holding means also participates to reducing the time necessary for the user to equip himself with the breathing system.

The user within the aircraft may be a crew member, in particular a pilot, or a passenger.

Preferably, the holding means may further comprise tightening means which connect the face-fitting device to the back portion of these holding means, and the tightening means are suitable for adjusting so that the holding means permanently retain the face-fitting device on the face. The tightening means may also be suitable for causing the release of the removable fixing means when they operate for adjusting.

In particular embodiments of the invention breathing system, the tightening means may comprise at least one strip which connects the face-fitting device to the back portion of the holding means, and a reel arranged for winding up this strip. Such embodiments can be highly reliable and manufactured easily.

Possibly, the tightening means may be suitable for first performing an automatic reduction in a length existing between the face-fitting device and the back portion of the holding means, and thereafter for adjusting a pressure of the face-fitting device onto the face.

In some user-operated embodiments of the invention, the tightening means may comprise a spring function element which is arranged for performing the automatic reduction in the length existing between the face-fitting device and the back portion of the holding means, and may further comprise a manual actuator suitable for the user to adjust the pressure of the face-fitting device by operating this manual actuator. Also, the tightening means may advantageously be arranged so that operation of these latter by the user prevents a continuation of the automatic reduction in the length existing between the face-fitting device and the back portion of the holding means. Thus the user can actuate the tightening means by his own in accordance to his fitting preferences, in particular by further adjusting the length between the face-fitting device and the back portion. In this way, he can easily obtain the desired pressure for the face-fitting device onto his face.

Preferably for such user-operated embodiments of the invention, the tightening means may be further arranged so that a first stage of the operation of the manual actuator by the user inhibits an effect of the spring function element, and a second stage of the operation of the manual actuator by the user produces an increase in the pressure of the face-fitting device onto the face, the second stage occurring after the first stage. In this way, the breathing system can be fitted on the head of the user even more rapidly. More preferably, the first and second stages of the operation of the manual actuator by the user may form a continuous operation movement performed by the user. When such user-operated embodiments are implemented with at least one strip for connecting the face-fitting device to the back portion of the holding means, and a reel for winding up this strip, the tightening means may further comprise:

a spring which is arranged for causing a rotation of the reel so as to automatically wind up the strip;

a circular flange which is arranged around the reel so as not to rotate with the reel, and which has at least one slit such that the strip exits from the reel through the slit; and a rotation-operable knob forming the manual actuator, which is provided with at least one extension arranged for pinching the strip against the circular flange according to a strip segment length set by an angular position of the knob.

Possibly, the reel, the spring, the circular flange and the knob may be arranged on the face-fitting device. The system can thus be compact and easily operable.

Also possibly, the tightening means may further comprise block-and-release means which are arranged for preventing a reverse motion of the knob due to a tension of the strip, but allowing such reverse motion upon special release action by the user onto these block-and-release means. Unwanted release of the tightening means is thus avoided, while allowing desired release for take-off of the face-fitting device.

Also possibly, the tightening means may be adapted so that an effectiveness of a further operation of the manual actuator for increasing the pressure of the face-fitting device onto the face automatically stops once a force applied on the manual actuator for this further operation has reached a threshold. In this way, the fitting of the device on the user's head may be performed with a standard predetermined pressure, whatever the head size and although the tightening means are manually operated.

In alternative embodiments of the invention which are of automatic operation type, the tightening means may comprise pressure control means which are arranged for automatically adjusting the pressure of the face-fitting device onto the face. Possibly, such pressure control means may comprise at least one among a prestressed spring, a torque-limited motor or pneumatic device. Also possibly, the tightening means may further comprise a sensor adapted for issuing a detection signal, and the pressure control means may be arranged for being activated by the detection signal. For such detection-based embodiments, the sensor may be suitable for detecting at least one among:

the user's face being close to the face-fitting device;
a contact of the user's face with the face-fitting device;
the pressure currently existing for the face-fitting device against the user's face; and
a breathing-in made by the user.

Generally for the invention, the storage means may comprise a housing which is suitable for containing the face-fitting device in the storage position. This housing may be fixedly arranged on the headrest of the seat or within the headrest.

Possibly, the storage means may be integrated within the seat headrest.

A second aspect of the invention proposes a seat for an aircraft user, which comprises a headrest and a breathing system in accordance with the first invention aspect. Possibly, the storage means may be fixedly added to the headrest of the seat. But other implementations of the invention may involve storage means which are separate from the seat, for example located on a support near the user's seat or integrated within the ceiling over the user's seat.

These and other features of the invention will be now described with reference to the appended figures, which relate to preferred but not-limiting embodiments of the invention.

BRIEF DESCRIPTION OF THE DRAWINGS

FIG. 3 is a perspective exploded view of an assembly within the end-user part of the breathing system of FIG. 1, corresponding to a user-operated embodiment of the invention;

FIGS. 4a and 4b are perspective views of one element of the end-user part of FIG. 3;

For clarity sake, element sizes which appear in these figures do not correspond to actual dimensions or dimension ratios. Also, same reference signs which are indicated in different ones of these figures denote identical elements of elements with identical function.

Figure 1:
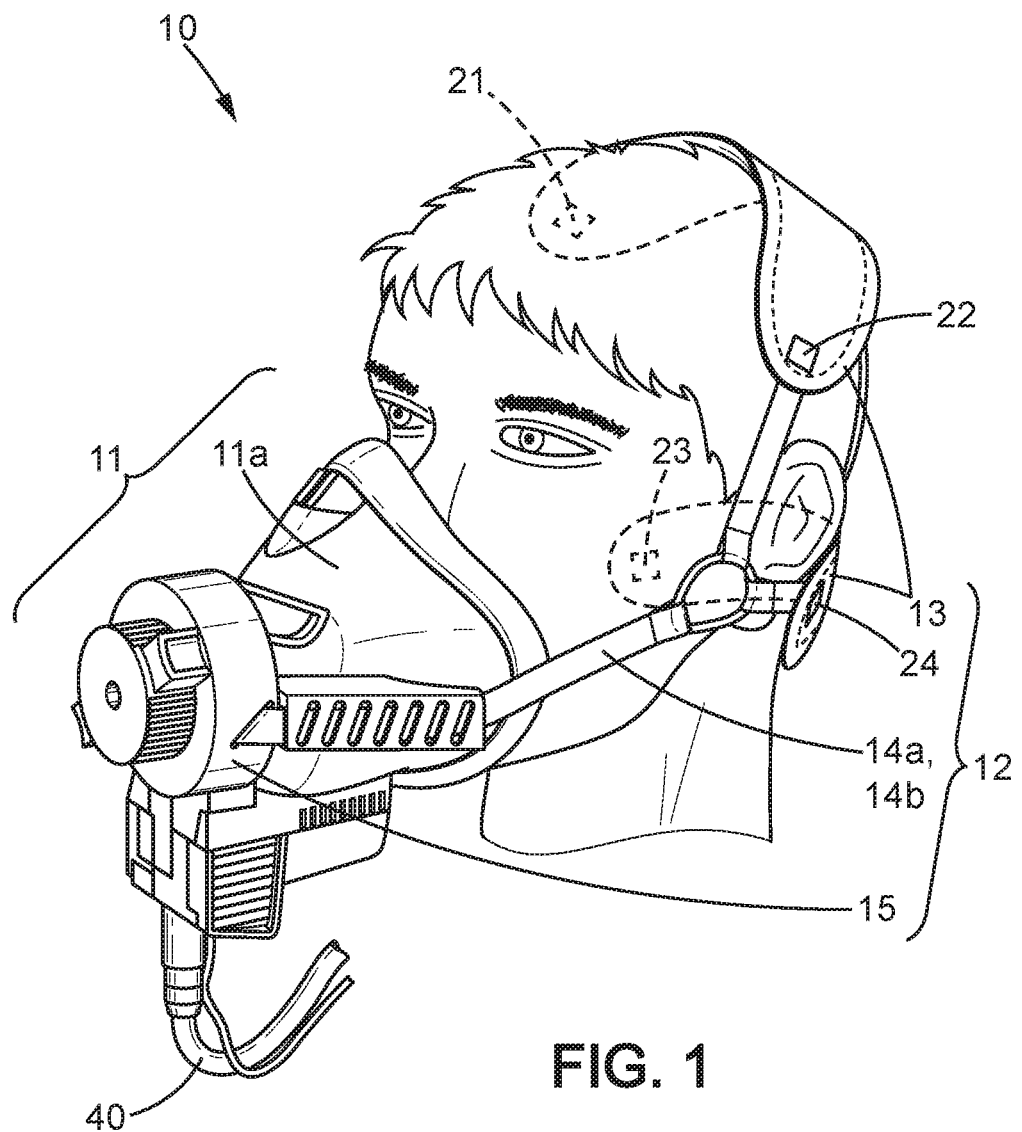
FIG. 1 is a perspective view of an end-user part of a breathing system according to the invention.

For illustrative purpose, the description is provided in the case of the breathing system being intended for an aircraft crew member, but it applies similarly to any passenger inside the aircraft.

DETAILED DESCRIPTION OF THE INVENTION

A breathing system according to the invention comprises an end-user part 10, an oxygen source unit (not shown), storage means and a removable fixing means 21-24. It is intended to be used in case of depressurization of the aircraft or in case of emergency, for example when smoke develops within the aircraft.

The end-user part 10 is intended to be put on the head by an aircraft crew member, and then delivers an oxygen-containing gas to breath-in by the crew member instead of breathing ambient air. The end-user part 10 is comprised of a face-fitting device 11 to be placed in front of the nose and mouth of the crew member, and holding means 12 which retain the face-fitting device 11 on the crew member's face after the end-user part 10 has been put on by the crew member. The holding means 12 comprise a back portion 13 which applies onto the top or back part of the head in put-on position, for retaining the face-fitting device 11. In alternative embodiments of the invention, the back portion 13 of the holding means 12 may be comprised of one or several horizontal strips, a web piece, a cushion, part of a hood or a net, etc. For illustrative purpose, the back portion 13 as represented is comprised of two web pieces which are intended to apply on the top and lower back parts of the head. In addition to the back portion 13, the holding means 12 of the end-user part 10 also comprise tightening means which connect the face-fitting device 11 to the back portion 13, so as to retain permanently the face-fitting device 11 against the face of the crew member in the put-on position. More specifically, these tightening means are intended to adjust the distance between the face-fitting device 11 and the back portion 13 of the holding means 12, so that the end-user part 10 of the breathing system remains in place on the crew member's head.

The oxygen-containing gas is supplied to the face-fitting device 11 by the oxygen source unit, using a flexible gas conduct 40 which connects a gas outlet of the oxygen source unit to the face-fitting device 11.

Storage position of the face-fitting device 11 corresponds to the breathing system being in a state ready-for-use. In such storage position, the face-fitting device 11 may be contained in a housing 30 (FIG. 2a) which is integrated with the headrest 100 of the seat of the crew member within the aircraft, or affixed to the headrest 100. But a suitable support may be provided alternatively on the headrest 100 for holding the face-fitting device 11 in the storage position. Generally for the invention, the headrest 100 is equipped with storage means which are dedicated to hold the face-fitting device 11 in the storage position.

The removable fixing means 21-24 are provided on the back portion 13 of the holding means 12 on one hand, and on the front face 101 of the headrest 100 one the other hand. They are intended to retain the back portion 13 of the holding means 12 on the headrest 100, at least as long as the face-fitting device 11 is in the storage position. Most preferably, the back portion 13 of the holding means 12 in the retain position is located behind the back part of the crew member's head when in sat position. In various embodiments of the invention, the removable fixing means 21-24 may be comprised of scratch segments, for example of Velcro® type, or press studs, resilient clips or any other equivalent systems.

In the invention embodiments which are illustrated by the figures, the tightening means comprise a reel-based system 15 and two strips 14a and 14b which originate from each side end of the back portion 13, respectively on left and right sides. The reel-based system 15 is capable of adjusting the length of the strips 14a and 14b, and thereafter adjusting the pressure of the face-fitting device 11 onto the face of the crew member. Preferably but not in compulsorily, the reel-based system 15 may be combined with a breathing mask 11a for forming the face-fitting device 11.

Figure 2A:
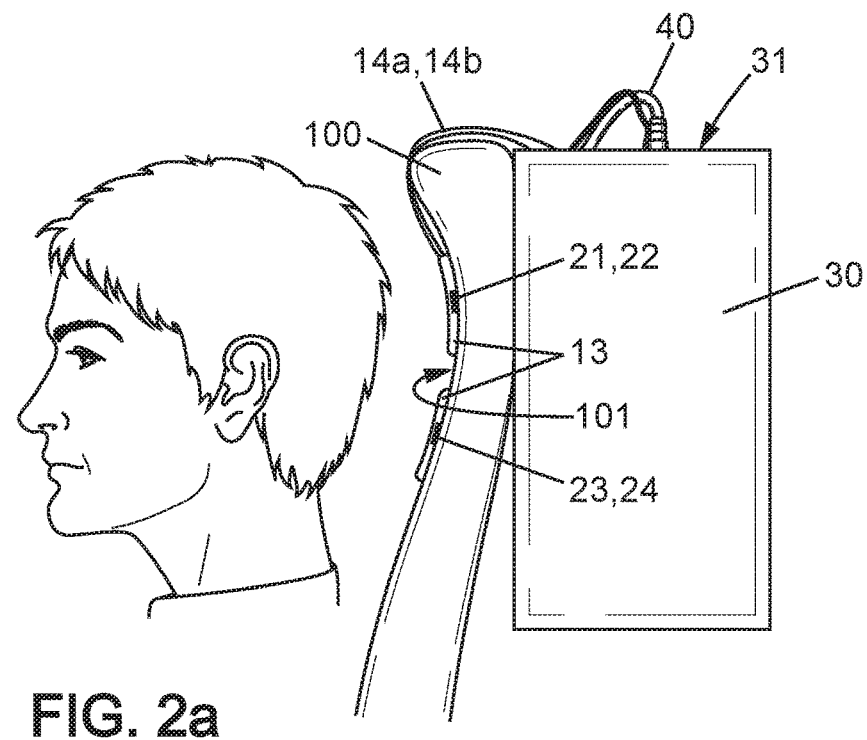
FIGS. 2a to 2f illustrate a put-on sequence by an end-user, for the breathing system of FIG. 1.

FIG. 2a shows the crew member sat on the seat while the breathing system is in storage position. So the face-fitting device 11 is contained in the housing 30 located on the headrest 100, or behind this latter or also integrated therein. At the same time, the back portion 13 is retained on the front face 101 of the headrest 100 by the removable fixing means 21-24. The strips 14a and 14b extend from the stored face-fitting device 11 to the retained back portion 13, through an opening 31 of the housing 30. Possibly but not necessarily, the length of the strips 14a and 14b may be automatically adjusted by the tightening means so as to avoid any trouble due to the strips 14a and 14b being loose in the storage position.

Figure 2B:
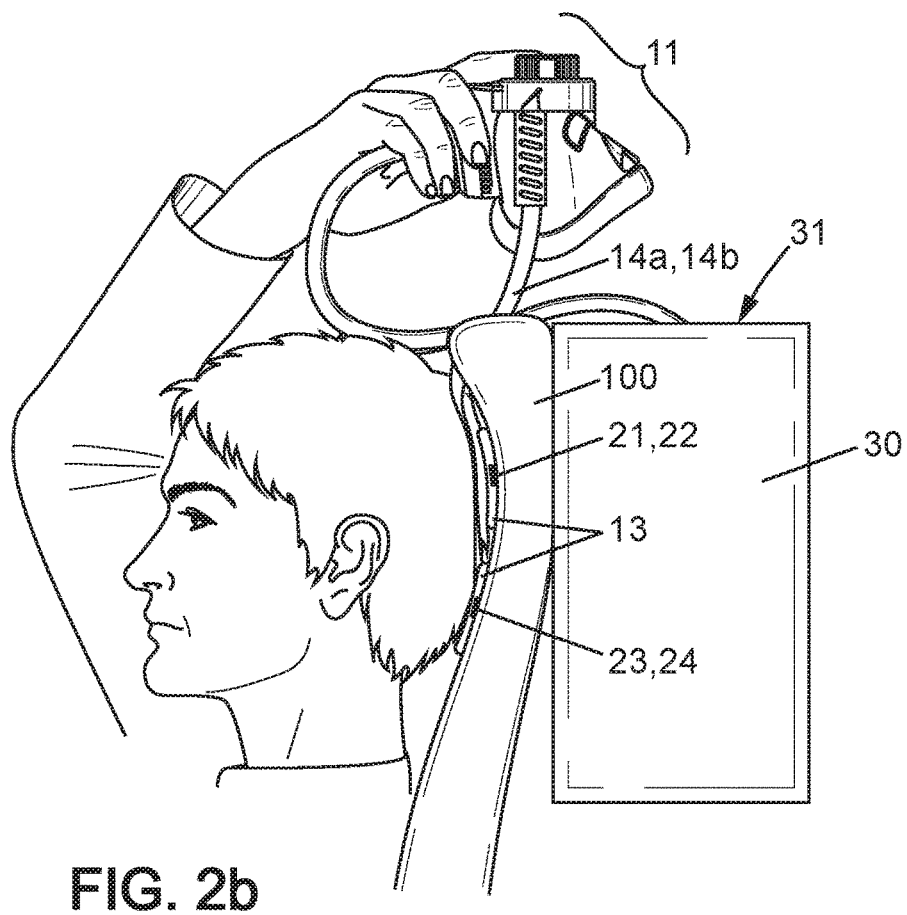

FIG. 2b shows the crew member grasping the face-fitting device 11 over his head, from the housing 30. For easy access to the face-fitting device 11 in the storage position, the opening 31 of the housing 30 may be permanently open, or closed with a lid (not shown) capable of being operated quickly. As explained later, the tightening means may be operated by the crew member upon grasping the face-fitting device 11 for allowing the strips 14a and 14b to increase in length.

Figure 2C:
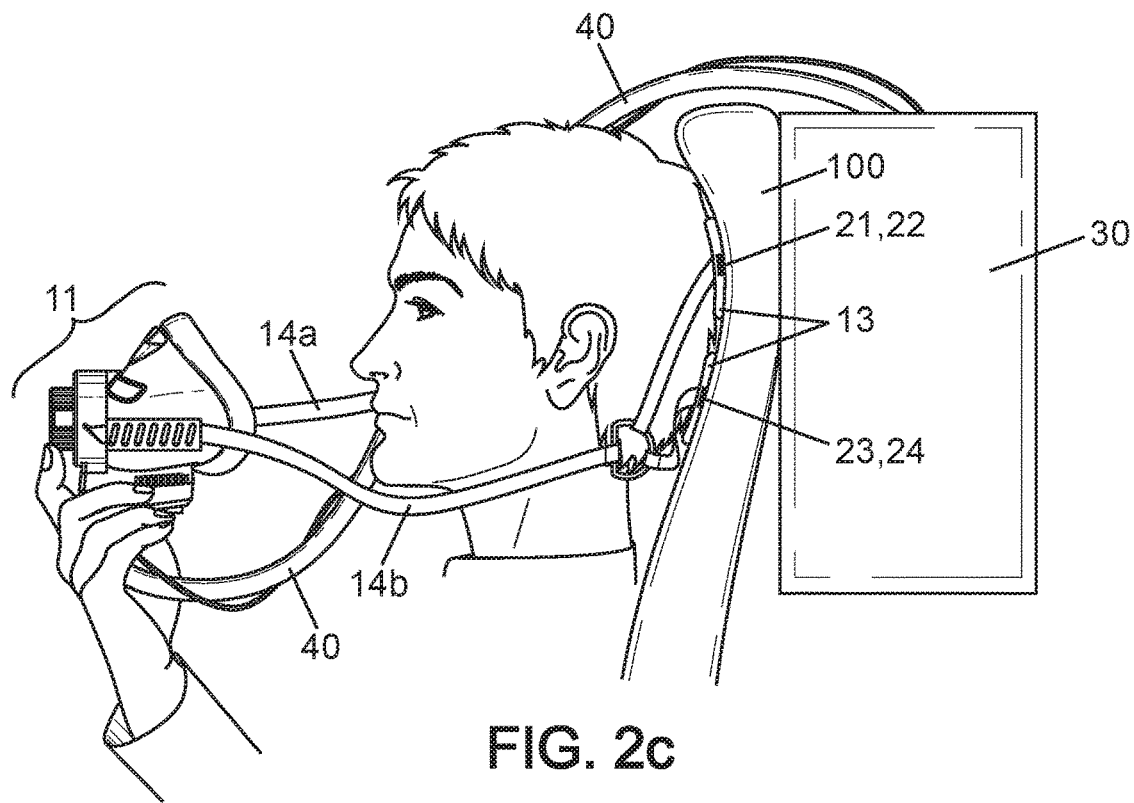

FIG. 2c shows the crew member holding the face-fitting device 11 before he applies it on his face. The distance between the face-fitting device 11 and the back portion 13 retained on the headrest 100 is maximum at this time, corresponding to maximum useful length for the strips 14a and 14b.

Figure 2D:
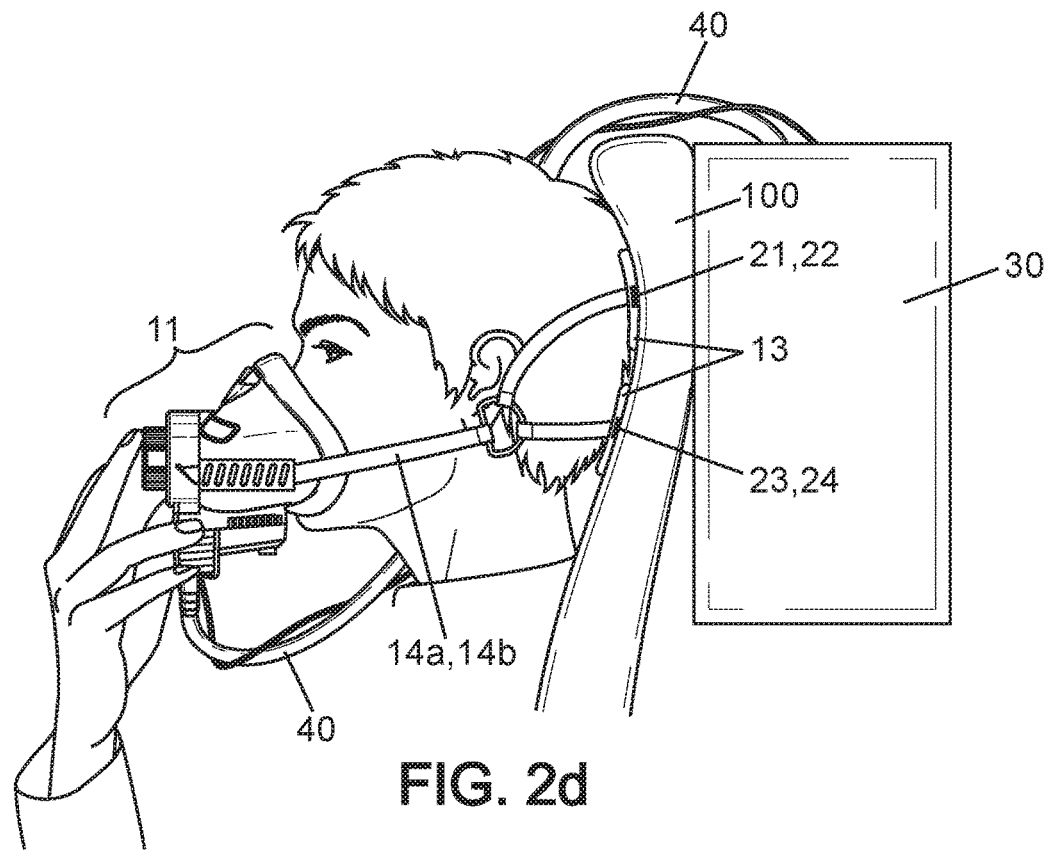

Then at FIG. 2d, the crew member moves the face-fitting device 11 towards his face and places it on his nose and mouth area. The tightening means automatically reduce the length of the strips 14a and 14b, in a manner that will be also described later for the exemplary strip- and reel-based embodiment.

Figure 2E:
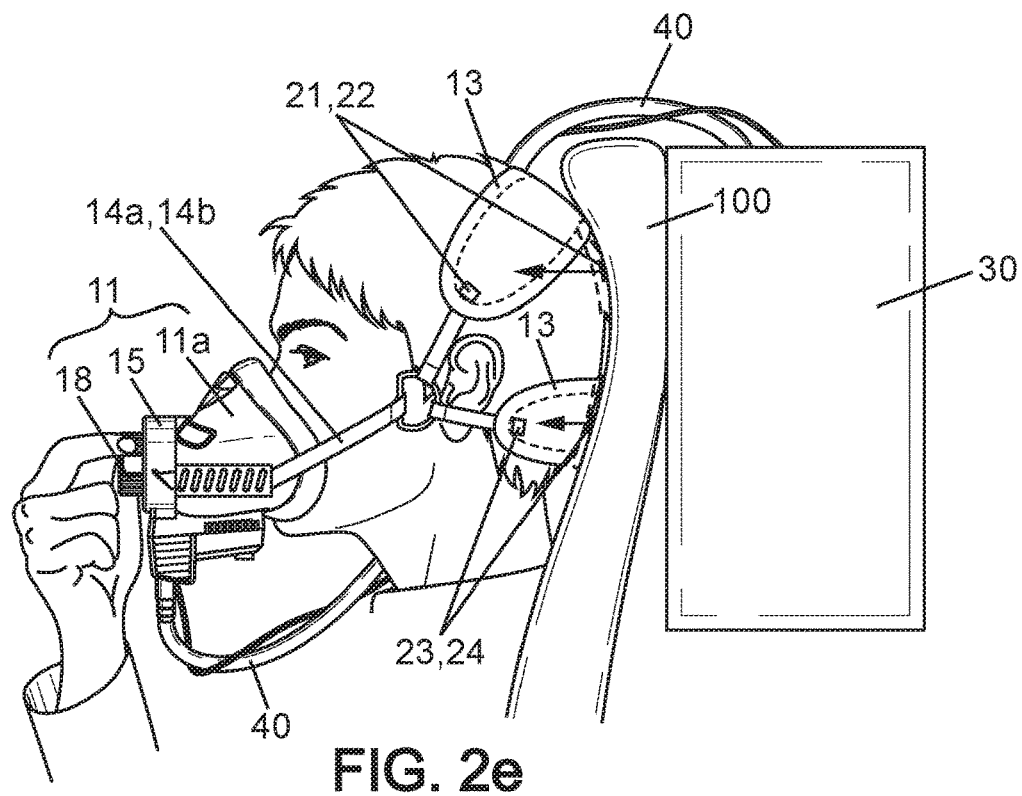

FIG. 2e illustrates a further step which is separate from that of FIG. 2d. In this further step, the tightening means are operated so as to produce a tightening force which is sufficient for the end-user part 10 of the breathing system to remain in a stable manner on the crew member's head, with the face-fitting device 11 in correct position on the face. According to the invention, the operation of the tightening means in this step causes the removable fixing means 21 to 24 to be released. In the strip- and reel-based embodiment, the release of the fixing means 21 to 24 is produced by the strips 14a and 14b pulling on the side ends of the back portion 13, thereby tearing this back portion 13 away from the headrest 100. Preferably to this purpose, the crew member may keep his head close to or against the front face 101 of the head rest 100. Then, the tightening means allows adjusting the pressure of the face-fitting device 11 onto the crew member's face.

Figure 2F:
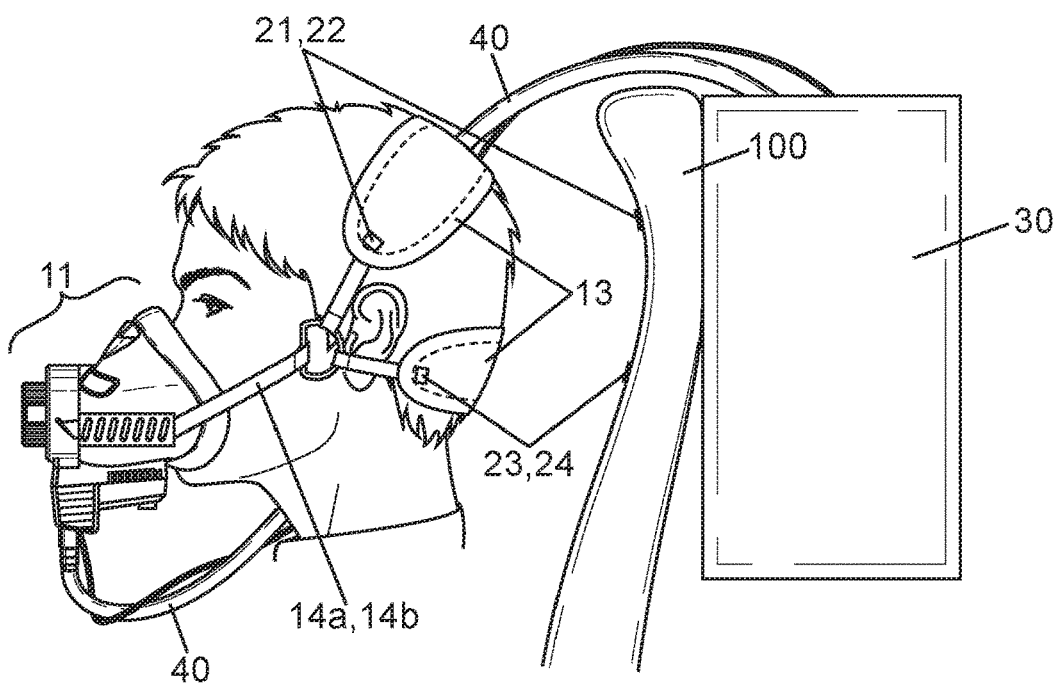

After tightening has been operated, putting-on of the end-user part 10 of the breathing system is finished, and the head of the crew member is free (FIG. 2f).

FIGS. 3 and 4a-4d relate to an user-operated embodiment of the tightening means, also implementing the strips 14a and 14b. The reel-based system 15 now described is to be assembled permanently with the breathing mask 11a, for example on a front or lower side of this latter. In FIGS. 3 and 4a-4d, the following reference signs have the meanings now recited:

16 casing of the system 15, fixed relative to the breathing mask 11a
17 reel for winding up or unrolling the strips 14a and 14b
18 manual actuator, for example in the form of a rotational knob
19 rolled spring
16a (resp. 16b) lateral sliding guide for the strip 14a (resp. 14b)
16c fixed center shaft
16d slot in the shaft 16c
16e inner crown with cogs, within the casing 16
16f circular flange, fixed relative to the casing 16
16g$_a$ (resp. 16g$_b$) slit through the circular flange 16f for passing of the strip 14a (resp. 14b)
16h$_a$ (resp. 16h$_b$) external slit for the strip 14a (resp. 14b) to exit from the casing 16

$A_a$ ($A_b$) arrow showing the path of the strip 14a (resp. 14b)

18a grasp area of the manual actuator 18

18b extensions fixed relative to the manual actuator 18

18c release buttons

18d resilient clips retracted by pressing on the release buttons 18c

The rolled spring 19, the reel 17 and the manual actuator 18 are concentrically inserted on the shaft 16c. In addition, a center end of the rolled spring 19 is inserted into the slot 16d, and a peripheral end of the rolled spring 19 is inserted in a slot internal to the reel 17 (not shown). The strips 14a and 14b are both rolled together around the reel 17, and the strip 14a goes though the slits $16g_a$ and $16h_a$, and then through the guide 16a toward the right end of the back portion 13. Similarly, the strip 14b goes though the slits $16g_b$ and $16h_b$, and then the guide 16b toward the left end of the back portion 13. In this way, the rolled spring 19 can cause a winding-up of both strips 14a and 14b simultaneously, resulting in an automatic and balanced reduction in the length of the strips 14a and 14b. This strip length reduction is implemented between the put-on steps illustrated by the FIGS. 2c and 2d.

Figure 4C:
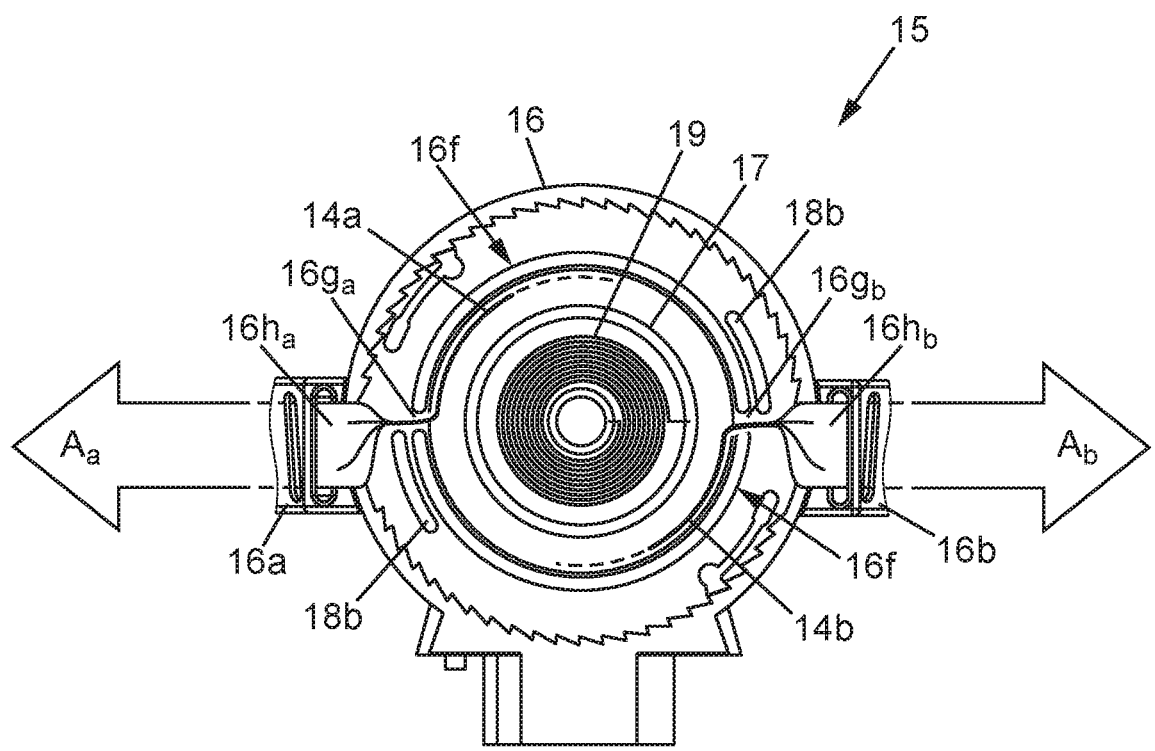
FIGS. 4c and 4d illustrate an operation of the assembly of FIG. 3.
Figure 4D:
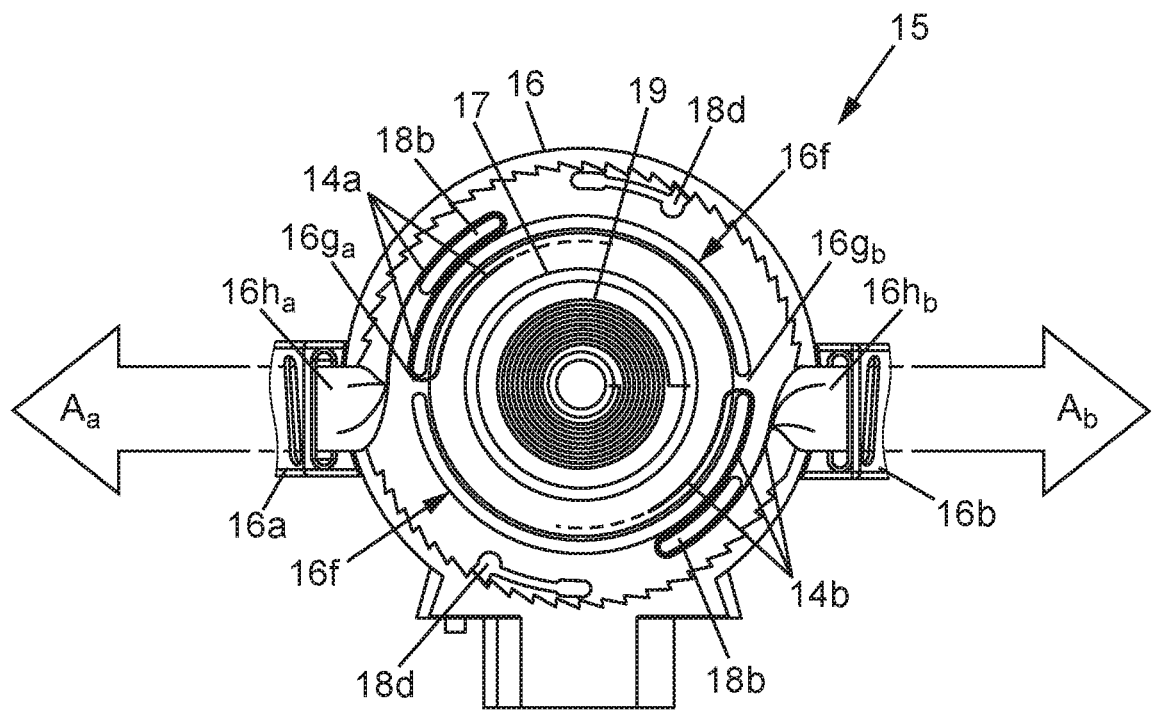

As shown in FIGS. 3, 4b, 4c and 4d, one of the extensions 18b is provided to pinch a segment of the strip 14a against the circular flange 16f, between the passing-through in the slits $16g_a$ and $16h_a$, according to a segment length which is set by the angular position of the manual actuator 18. Same operation is provided for the strip 14b. FIG. 4c shows the actuator position where zero strip length is pinched: the strip 14a travels along a nearly straight path from the slit $16g_a$ to the slit $16h_a$, corresponding to the reel-based system 15 being effective for reducing automatically the strip length. FIG. 4d shows a position obtained after the manual actuator 18 has been rotated by the crew member, with rotation angle of less than 180° (degree): each extension 18b applies a segment of one of the strips 14a/14b against the flange 16f, with a common segment length which is set by the rotation angle of the manual actuator 18. This actuator rotation has thus the three following combined effects:

inhibiting a further strip length reduction which would be produced by the rolled spring 19;

causing a manually selected reduction of the strip length, additionally to that previously produced by the rolled spring 19 before the put-on step of FIG. 2d; and applying the face-fitting device 11 on the crew member's face, with a pressure set by the extent of this manual reduction of the strip length.

This operation of the manual actuator 18 is performed in the put-on step which is illustrated in FIG. 2e.

The resilient clips 18d engage the cogs of the internal crown 16e so that rotation of the actuator 18 for reducing the strip length is possible, but reverse rotation of the actuator 18 driven by the tension of the strips 14a and 14b is impossible. However, for allowing that the strip length can increase when the face-fitting device 11 is pulled away from the crew member's face, the release buttons 18c can be pressed by the crew member for inhibiting the effect of the clips 18d. To this end, the release buttons 18c cause the clips 18d to shift toward the shaft 16c, thereby disengaging from the cogs of the internal crown 16e. Once the actuator 18 has thus been rotated back to the angular position of FIG. 4c, automatic winding-up or elastic unrolling of the strips 14a and 14b is recovered, in particular for taking the face-fitting device 11 off, or for the first step of extracting the face-fitting device 11 from the housing 30 (FIGS. 2b and 2c). Thus, the release buttons 18c together with the resilient clips 18d form the block-and-release means which have been mentioned in the general part of the invention description.

Figure 5A:
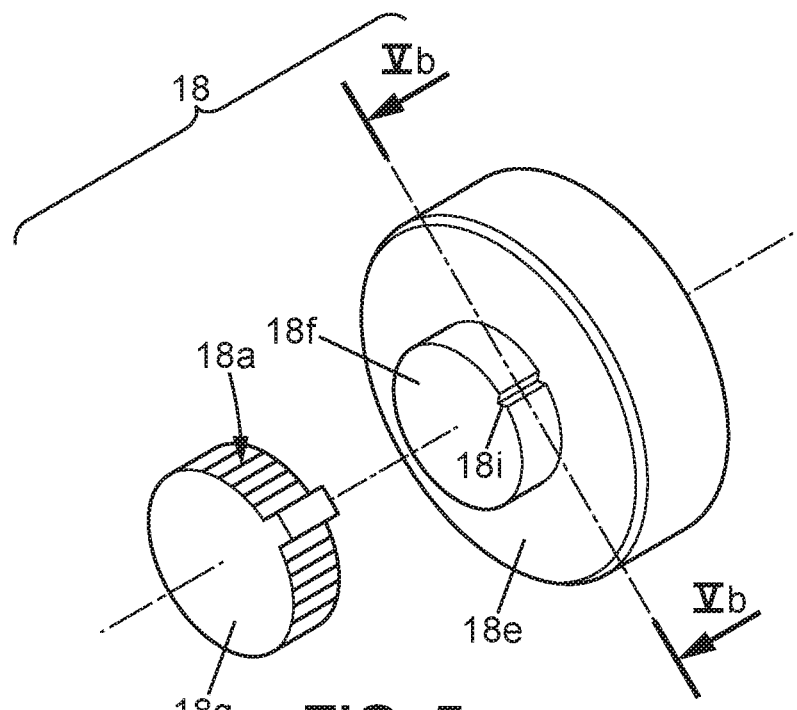
FIGS. 5a and 5b illustrate a first improvement of a breathing system according to the invention.
Figure 5B:
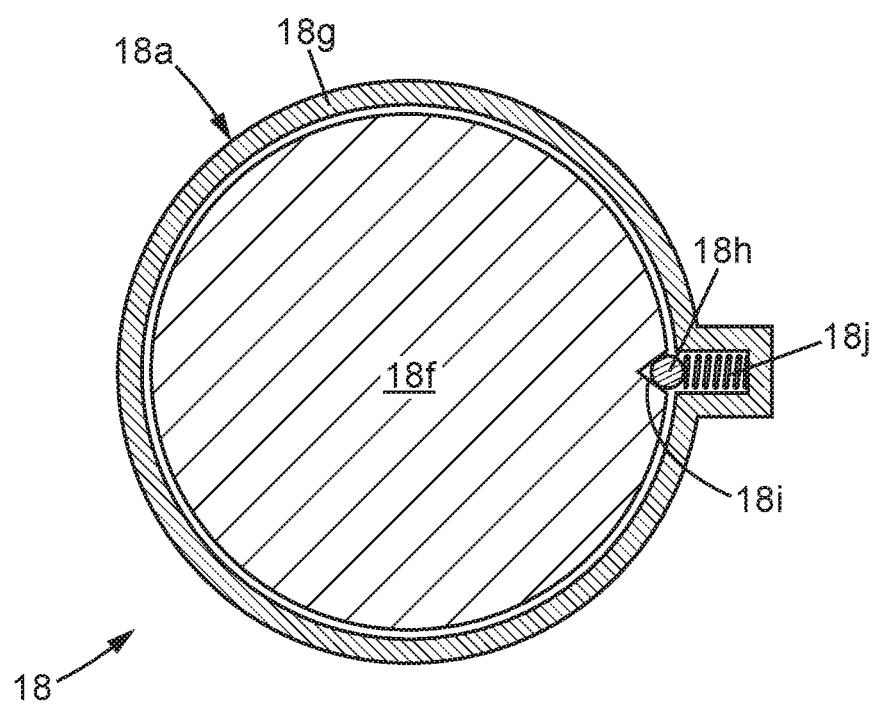

It is possible to produce a predetermined application pressure of the face-fitting device 11 onto the crew member's face, upon operation of the tightening means whatever the size of the crew member's head. To this purpose, the grasp area 18a may no longer be integral with a base part 18e of the actuator 18. The base part 18e may be provided itself with the extensions 18b, and possibly also with the block-and-release means. The base part 18e is further provided at its front end with a center hub 18f, and an additional piece 18g which forms the grasp area 18a is rotationally mounted onto the hub 18f. FIGS. 5a and 5b illustrate a possible implementation for the additional piece 18g for driving the base part 18e in rotation only if the actuation torque is less than a predetermined threshold. The jamming of the additional piece 18g on the base part 18e is produced by a ball 18h which is pushed into a groove 18i formed into the hub 18f, by a prestressed spring 18j. When the actuation torque which is applied by the crew member on the grasp area 18a is excessive, then the ball 18i is pushed back within the additional piece 18g and the additional piece 18g no longer drives in rotation the base part 18e of the actuator 18. In this way, the tightening means are able to limit the pressure of the face-fitting device 11 onto the face, with the maximum pressure being set by the prestressed spring 18j. Optionally, the prestress state of the spring 18j may be adjusted by a suitable screw (not shown) pushing onto the end of the spring 18j which is opposite the ball 18i. Such embodiment suitable for producing a predetermined application pressure for the face-fitting device 11 whatever the head size is only provided for illustrative purpose, and numerous variants may be implemented alternatively. Obviously, the block-and-release means may be combined with such implementations of predetermined application pressure, in manners which are accessible for the Man skilled in the art although not represented in the figures.

Figure 6A:
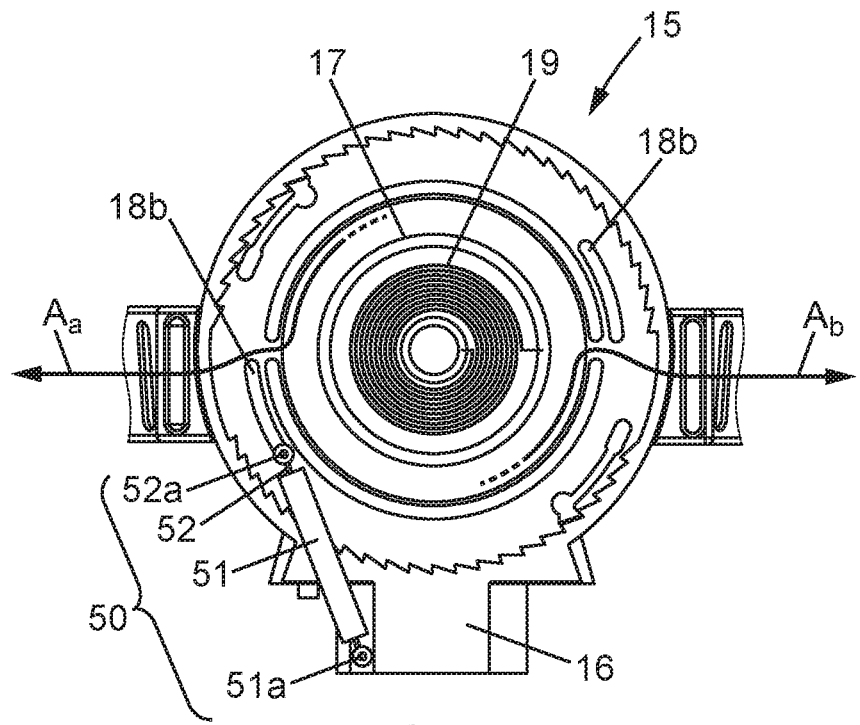
FIGS. 6a and 6b illustrate a second improvement of a breathing system according to the invention, corresponding to an embodiment of automatic operation type.
Figure 6B:
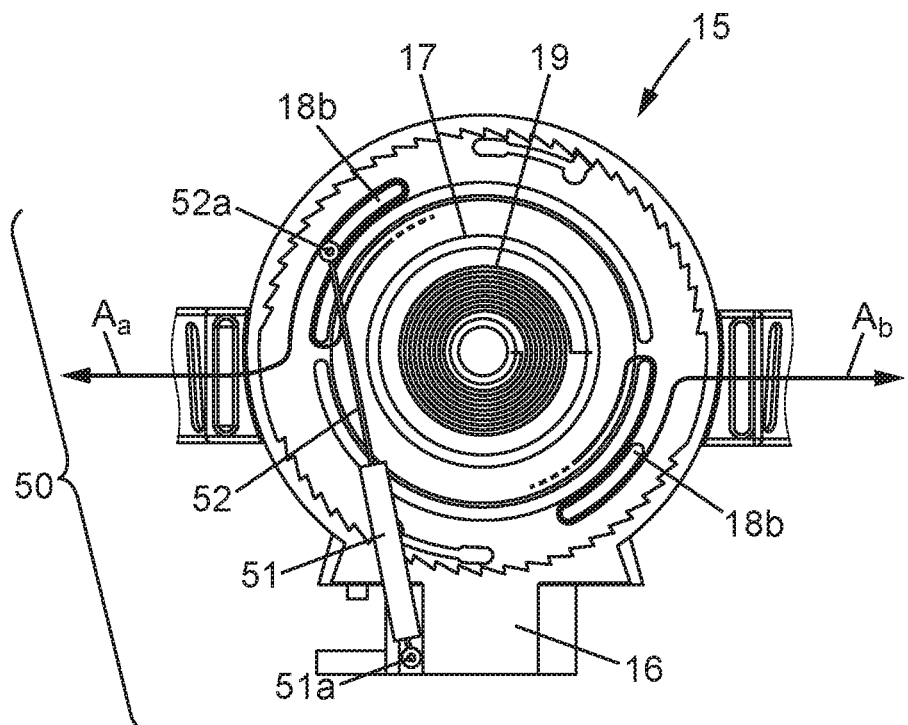

FIGS. 6a and 6b illustrate the principle of alternative embodiments in which the tightening means are automatically operated instead of manually by the crew member. This relates to the tightening step of FIG. 2e where the application pressure of the face-fitting device 11 onto the face is produced, but does not relate to the automatic reduction in the strip length which occurs between the steps of FIGS. 2c and 2d. Such embodiment with automatic tightening may be based again on strips and reel, with an arrangement similar to that already described. But the manual operation of the actuator 18 is replaced by an automatic one.

In such implementation, the automatically operating tightening means may comprise pressure control means and optionally sensor.

The pressure control means may comprise a small jack 50, having a cylinder end which may be rotationally connected to the casing 16, and a piston end which may be rotationally connected to the actuator 18 at a peripheral location of this latter. In FIGS. 6a and 6b, the reference number 51 denotes the cylinder of the jack 50, 51a the cylinder end, 52 the piston, and 52a the piston end. The operation of the rolled spring 19 is unchanged, and only the tightening is performed by the jack 50. The jack 50 may be spring-based, if a suitable prestressed spring is contained in the cylinder 51 for pulling the piston 52 into the cylinder 51. FIGS. 6a and 6b illustrate two positions of such automatic tightening means, corresponding respectively to the FIGS. 4c and 4d. Obviously, the jack 50 with linear motion configuration may be replaced with another device equivalent but with rotational motion.

Also possibly, such operation based on a prestressed spring may be replaced by a pneumatic jack or pneumatic rotational device, in particular using the gas which is delivered by the breathing system itself. Then the pressure of the gas which is inflated into the pneumatic jack determines a maximum application pressure for the face-fitting device 11 onto the crew member's face.

Other arrangements for the automatic tightening means may be based on a motor, in particular an electric motor, for driving in rotation the reel 17 so as to first reduce the length of loose strips, and then producing the application pressure of the face-fitting device 11 onto the crew member's face. Preferably, the motor driving may be limited in torque, in one of the manners commonly known in motor implementation. For example, the torque limitation may be based on a prestressed spring in a manner similar to that described with reference to FIGS. 5a and 5b.

Jack or motor so-implemented have been denoted pressure control means in the general description of the invention.

Generally for automatic tightening means, namely for tightening means capable of automatically adjusting the application pressure of the face-fitting device 11 onto the face, activation of the tightening may be triggered by an appropriate detection. The Man skilled in the art knows various sensors which are suitable for detecting when the face-fitting device 11 is close to the face, so as to switch from the step of reducing loose strip length to the step of adjusting the application pressure onto the face. For example, a distance-measuring sensor may be implemented on the face-fitting device 11 for detecting the separating distance to the crew member's face. Alternatively, a contact-detecting sensor may be used, either of mechanical or electrostatic type. Another variant may implement a pressure sensor which is located on the face-fitting device 11, and which measures the application pressure onto the face. Such pressure sensor may be used not only for activating the pressure control means, but also for adjusting the application pressure onto the face during the continuing use of the breathing system, after it has been put-on by the crew member.

Still another sensor type may be also implemented alternatively, which is based on detection of a breathing-in made by the crew member. For example, such sensor operates by detecting an air depression which occurs within the breathing mask 11a.

The invention claimed is:

1. Breathing system for an aircraft crew member or passenger, thereafter denoted user, sat on a seat within the aircraft, said system comprising:
   a face-fitting device suitable for being applied onto at least a lower portion of a face of the user, and for delivering an oxygen-containing gas;
   holding means suitable for retaining the face-fitting device in position on the face, and comprising a back portion suitable for applying onto a top or back part of the user's head when said holding means operate for retaining said face-fitting device on the face; and
   storage means suitable for retaining the face-fitting device in a storage position apart from the head when the breathing system is not used;
   wherein said breathing system further comprises
   removable fixing means, the removable fixing means being provided at least on the back portion of the holding means, and configured to retain the back portion of the holding means affixed to a headrest of the seat when the face-fitting device is in the storage position and to be released when the holding means are retaining the face-fitting device on the face.

2. Breathing system according to claim 1, wherein the storage means comprise a housing suitable for containing the face-fitting device in the storage position, said housing being fixedly arranged on the headrest of the seat or within said headrest.

3. Seat for an aircraft user, comprising a headrest and a breathing system according to claim 1.

4. Seat according to claim 3, wherein the storage means are fixedly added to the headrest.

5. Breathing system for an aircraft crew member or passenger, thereafter denoted user, sat on a seat within the aircraft, said system comprising:
   a face-fitting device suitable for being applied onto at least a lower portion of a face of the user, and for delivering an oxygen-containing gas;
   holding means suitable for retaining the face-fitting device in position on the face, and comprising a back portion suitable for applying onto a top or back part of the user's head when said holding means operate for retaining said face-fitting device on the face; and
   storage means suitable for retaining the face-fitting device in a storage position apart from the head when the breathing system is not used;
   wherein said breathing system further comprises:
   removable fixing means suitable for retaining the back portion of the holding means affixed to a headrest of the seat when the face-fitting device is in the storage position; and in that the removable fixing means are suitable for being released when the holding means are retaining the face-fitting device on the face; and
   wherein the holding means further comprise tightening means which connect the face-fitting device to the back portion of said holding means, and said tightening means are suitable for adjusting so that the holding means permanently retain the face-fitting device on the face, and the tightening means are suitable for causing the release of the removable fixing means when said tightening means operate for adjusting.

6. Breathing system according to claim 5, wherein the tightening means comprise at least one strip which connects the face-fitting device to the back portion of the holding means, and a reel arranged for winding up said at least one strip.

7. Breathing system according to claim 6, wherein the tightening means further comprise:
   a spring arranged for causing a rotation of the reel so as to automatically wind up the strip;
   a circular flange arranged around the reel so as not to rotate with the reel, and having at least one slit such that the strip exits from the reel through the slit; and
   a rotation-operable knob forming the manual actuator, provided with at least one extension arranged for pinching the strip against the circular flange according to a strip segment length which is set by an angular position of the knob.

8. Breathing system according to claim 7, wherein the reel, the spring, the circular flange and the knob are arranged on the face-fitting device.

9. Breathing system according to claim 7, wherein the tightening means further comprise block-and-release means arranged for preventing a reverse motion of the knob due to a tension of the strip, but allowing said reverse motion upon special release action by the user onto said block-and-release means.

10. Breathing system according to claim 5, wherein the tightening means are suitable for first performing an automatic reduction in a length existing between the face-fitting device and the back portion of the holding means, and thereafter for adjusting a pressure of the face-fitting device onto the face.

11. Breathing system according to claim 10, wherein the tightening means comprise a spring function element arranged for performing the automatic reduction in the length existing between the face-fitting device and the back portion of the holding means, and further comprise a manual actuator suitable for the user to adjust the pressure of the face-fitting device by operating said manual actuator.

12. Breathing system according to claim 11, wherein the tightening means are arranged so that operation of said tightening means by the user prevents a continuation of the automatic reduction in the length existing between the face-fitting device and the back portion of the holding means.

13. Breathing system according to claim 12, wherein the tightening means are further arranged so that a first stage of the operation of the manual actuator by the user inhibits an effect of the spring function element, and a second stage of said operation of the manual actuator by the user produces an increase in the pressure of the face-fitting device onto the face, the second stage occurring after the first stage.

14. Breathing system according to claim 13, wherein the tightening means are further arranged so that the first and second stages of the operation of the manual actuator by the user form a continuous operation movement performed by the user.

15. Breathing system according to claim 11, wherein the tightening means are adapted so that an effectiveness of a further operation of the manual actuator for increasing the pressure of the face-fitting device onto the face automatically stops once a force applied on said manual actuator for said further operation has reached a threshold.

16. Breathing system according to claim 10, wherein the tightening means comprise pressure control means arranged for automatically adjusting the pressure of the face-fitting device onto the face.

17. Breathing system according to claim 16, wherein the pressure control means comprise at least one among a prestressed spring, a torque-limited motor or pneumatic device.

18. Breathing system according to claim 16, wherein the tightening means further comprise a sensor adapted for issuing a detection signal, and the pressure control means are arranged for being activated by the detection signal, the sensor being suitable for detecting at least one among:
 the user's face being close to the face-fitting device;
 a contact of the user's face with the face-fitting device;
 the pressure currently existing for the face-fitting device against the user's face; and
 a breathing-in made by the user.

* * * * *